US009703588B2

(12) United States Patent
Yang et al.

(10) Patent No.: US 9,703,588 B2
(45) Date of Patent: Jul. 11, 2017

(54) DEPLOYMENT OF WEB CLIENT PLUGINS IN A VIRTUALIZED COMPUTING ENVIRONMENT

(71) Applicant: VMware, Inc., Palo Alto, CA (US)

(72) Inventors: Yang Yang, Shanghai (CN); Jin Feng, Shanghai (CN); Zhongping Lu, Shanghai (CN); Zhao Jin, Shanghai (CN); Chengmao Lu, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 116 days.

(21) Appl. No.: 14/457,122

(22) Filed: Aug. 12, 2014

(65) Prior Publication Data

US 2016/0048400 A1   Feb. 18, 2016

(51) Int. Cl.
*G06F 9/455* (2006.01)
*G06F 9/445* (2006.01)
*H04L 29/08* (2006.01)

(52) U.S. Cl.
CPC .......... *G06F 9/45558* (2013.01); *G06F 8/61* (2013.01); *G06F 9/44526* (2013.01); *H04L 67/10* (2013.01); *H04L 67/34* (2013.01); *G06F 9/45533* (2013.01); *G06F 2009/45595* (2013.01)

(58) Field of Classification Search
CPC .................................... G06F 9/45558
USPC ............................................... 718/1
See application file for complete search history.

(56) References Cited

U.S. PATENT DOCUMENTS

| 6,327,584 | B1 * | 12/2001 | Xian | G06F 17/3023 |
| 7,730,486 | B2 * | 6/2010 | Herington | G06F 9/5077 709/223 |
| 8,645,977 | B2 * | 2/2014 | Jacobson | G06F 9/45537 719/328 |
| 9,100,297 | B2 * | 8/2015 | DeHaan | H04L 41/0809 |
| 2003/0167320 | A1 * | 9/2003 | Perez | G06F 9/465 709/223 |
| 2009/0300597 | A1 * | 12/2009 | George | G06F 9/44526 717/173 |

OTHER PUBLICATIONS

Kevin Guyot, "SMiT—Local System Administration Across Disparate Environments Utilizing the Cloud", 2013, pp. 1-20.*
Sheng Liang et al., "Dynamic Class Loading in the Java Virtual Machine", 1998, pp. 1-9.*
VMware vSphere 5.1 Documentation Center, vSphere API/SDK Documentation, Sep. 10, 2012, retrieved at <http://pubs.vmware.com/vsphere-51/index.jsp?topic=%2Fcom.vmware.wssdk.apiref.doc%2Fvim.ExtensionManager.html>.

* cited by examiner

*Primary Examiner* — Wei Zhen
*Assistant Examiner* — Lanny Ung

(57) ABSTRACT

An example method to deploy a web client plugin in a virtualized computing environment may include obtaining information identifying a virtual machine at a management entity and generating configuration information that includes the information identifying the virtual machine. The method may further include registering, with the management entity, the configuration information to deploy the web client plugin as a web client extension. The registration is performed such that, in response to an access to the virtual machine via the web client plugin, the web client plugin is able to automatically identify the virtual machine based on the configuration information.

18 Claims, 7 Drawing Sheets

510

```
1:  <vmw:vServiceDependencySection ovf:required="true"
2:  vmw:id="installation">
3:      <ovf:Info>A vService dependency</ovf:Info>
4:      <vmw:Type>com.vmware.vservice.extension</vmw:Type>
5:      <vmw:Name>vCenter Extension Installation</vmw:Name>
6:      <vmw:Description>This appliance requires a binding to the vCenter
7:      Extension vService, which allows it to automatically register as a
8:      vCenter Extension at runtime.</vmw:Description>
9:      <vmw:Configuration/>
10: </vmw:vServiceDependencySection>
```

```
1:  <evs:GuestApi>
2:      <evs:URL>https://10.10.10.10/vsm/extensionService</evs:URL>
3:      <evs:Token>c5ae4586a3ae4badbb0959285cf2d313d0fdeab7
4:      </evs:Token>
5:      <evs:X509Thumbprint>da:13:34:e3:bb:e5:74:83:61:99:c6:fe:c7:55:
6:          42:14:3f:8b:e2:61</evs:X509Thumbprint>
7:  </evs:GuestApi>
8:
9:  <evs:VCenterApi>
10:     <evs:IP>10.10.10.10</evs:IP>
11:     <evs:X509Thumbprint>da:13:34:e3:bb:e5:74:83:61:99:c6:fe:c7:55:
12:         42:14:3f:8b:e2:61</evs:X509Thumbprint>
13:     <evs:HttpPort>80</evs:HttpPort>
14:     <evs:HttpsPort>443</evs:HttpsPort>
15:     <evs:SelfMoRef>VirtualMachine:vm-398</evs:SelfMoRef>
16:     <evs:Address>10.10.10.10</evs:Address>
17: </evs:VCenterApi>
```

Fig. 5B

DEPLOYMENT OF WEB CLIENT PLUGINS IN A VIRTUALIZED COMPUTING ENVIRONMENT

BACKGROUND

Unless otherwise indicated herein, the approaches described in this section are not admitted to be prior art by inclusion in this section.

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory and network resources to run an operating system and different applications.

BRIEF DESCRIPTION OF DRAWINGS

FIG. 5A illustrates an example section in an Open Virtualization Format (OVF) package for deployment of a virtual machine as a management extension;

FIG. 5B illustrates example context and privilege information provided by a management entity for the deployment of a virtual machine as a management extension;

DETAILED DESCRIPTION

Figure 1:
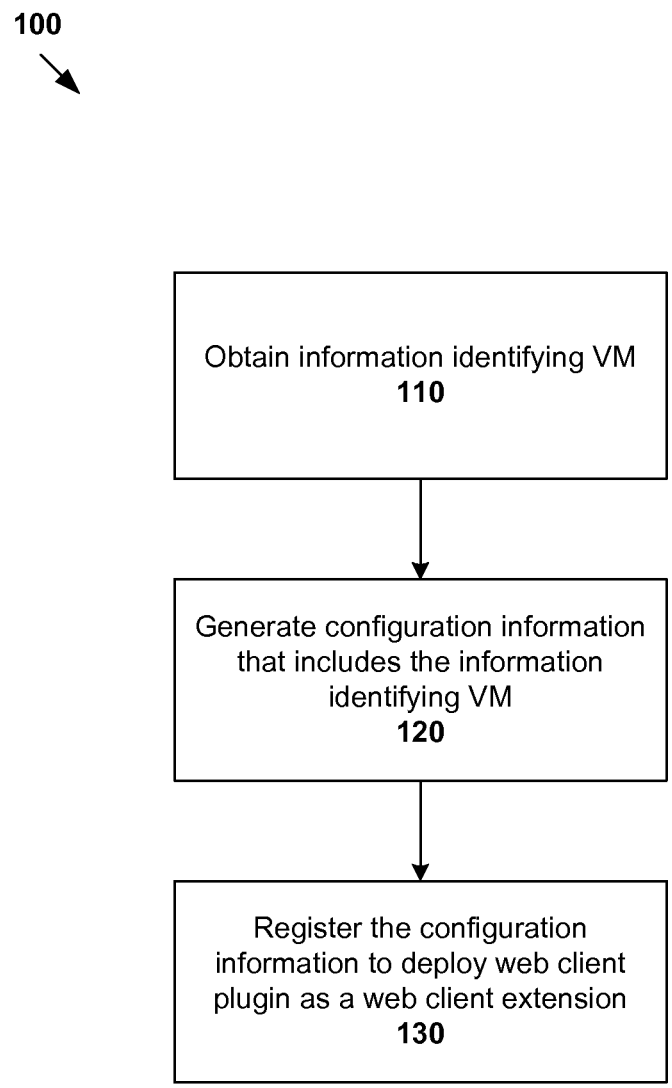
FIG. 1 is a flowchart of an example process for deploying of a web client plugin in a virtualized computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

In a virtualized computing environment, users may manage, monitor and administer various objects (e.g., hosts, virtual machines, storage resources, etc.) using a web client. The web client is generally a browser-based interface that may be used by the users to interact with the objects in the virtualized computing environment. A default web client is generally provided, but in some cases, users may wish to customize the web client to support new functionality that is more specific to the users' applications.

To extend the functionality of the web client (e.g., default web client), a "web client plugin" may be deployed in the virtualized computing environment. For example, the web client plugin may be deployed to add new user interface elements and retrieve data to populate the new user interface elements, etc. Throughout the present disclosure, the term "web client extension" (i.e. an extension of the web client) may generally refer to any suitable solution to extend a functionality of the web client by providing a new functionality, or modifying an existing functionality, etc.

According to examples of the present disclosure, deployment of a web client plugin is performed to facilitate automatic discovery between the web client plugin and a virtual machine in the virtualized computing environment. In more detail, FIG. 1 is a flowchart of an example process 100 for deploying of a web client plugin in a virtualized computing environment. Example process 100 may include one or more operations, functions, or actions illustrated by one or more blocks, such as blocks 110 to 130. The various blocks may be combined into fewer blocks, divided into additional blocks, and/or eliminated based upon the desired implementation.

At block 110, one designated virtual machine may be configured to obtain information that identifies the virtual machine (i.e., itself) at a management entity in the virtualized computing environment. The term "obtain" (or "obtaining", "obtained", or the like) may include receive (e.g., receiving the information from the management entity), generate (e.g., the virtual machine generating information) access (e.g., accessing information available to the virtual machine), or the like.

At block 120, the designated virtual machine may be configured to generate configuration information that includes the information identifying the virtual machine.

At block 130, the designated virtual machine may be configured to register, with the management entity, the configuration information to deploy the web client plugin as a web client extension. The registration is performed such that, in response to an access to the virtual machine via the web client plugin, the web client plugin is able to automatically identify the virtual machine based on the configuration information.

According to some examples, the designated virtual machine at block 110 in FIG. 1 may be deployed as a "management extension" to extend a functionality provided by the management entity. As used herein, the term "management extension" may generally refer to any suitable solution to extend the functionality of the management entity in the virtualized computing environment, such as by providing a new functionality or modifying an existing functionality, etc. For example, the virtual machine may be deployed as a management extension to provide a network attached storage (NAS) service, etc.

For example, the information identifying the virtual machine at block 110 in FIG. 1 may include a reference identifier that identifies the virtual machine as an object managed by the management entity and an identifier of the management entity. In the case of the virtual machine being deployed as a management extension, the information may further include information identifying the virtual machine as a management extension. For example, an extension key associated with registration of the virtual machine as a management extension may be used.

Block 110 in FIG. 1 will be further discussed with reference to examples in FIG. 4 to FIG. 5B, in which the virtual machine may obtain the information identifying the virtual machine during its registration as a management extension. For example, the identifier of the management entity and reference identifier of the virtual machine may be received from the management entity (e.g., relates to block 440 in FIG. 4), while the extension key discussed above may be generated by the virtual machine during management extension registration (e.g., relates to block 450 in FIG. 4). In relation to blocks 120 and 130 in FIG. 1, which will be discussed with reference to FIG. 6, the configuration information may include the identifier of the management entity, reference identifier of the virtual machine and extension key.

Using example process 100, information identifying the virtual machine may be stored in the configuration information of the web client plugin. The configuration information is used to deploy the web client plugin to facilitate automatic discovery and communication between the web client plugin and virtual machine. For example, when the web client plugin is used to access the virtual machine (e.g., to access a functionality provided by virtual machine), the web client plugin is able to identify the virtual machine.

The automatic discovery process may be used to simplify the development and implementation of applications that rely on interaction and communication between the web client plugin and virtual machine. For example, using example process 100, it is not necessary for the web client plugin to scan through all information relating to registration of different virtual machines to search for the required information. The scan and search operations are generally performed during run time, and may be time and resource intensive. The configuration information of the web client plugin may also be used to fetch the latest information of the virtual machine, such as based on the reference identifier that uniquely identifies the virtual machine as an object managed by the management entity.

According to examples of the present disclosure, example process 100 may be used to facilitate lifecycle management of the web client plugin. For example, the web client plugin may be automatically deployed following the deployment of the virtual machine. In this case, example process 100 may further include registering the virtual machine as a management extension. This may include sending, to the management entity, a specification (e.g., Open Virtualization Format (OVF) package) to notify the management entity that the virtual machine wishes to be registered as a management extension. In response, the management entity may provide context and privilege information (e.g., authentication token and thumbprint of a certificate, etc.) that may be used to register the virtual machine as a management extension.

The deployment in example process 100 may be performed at any suitable stage during the lifecycle of the web client plugin, such as when the web client plugin or virtual machine is installed for the first time, or when the web client plugin or virtual machine is upgraded to a newer version.

Virtualized Computing Environment

Figure 2:
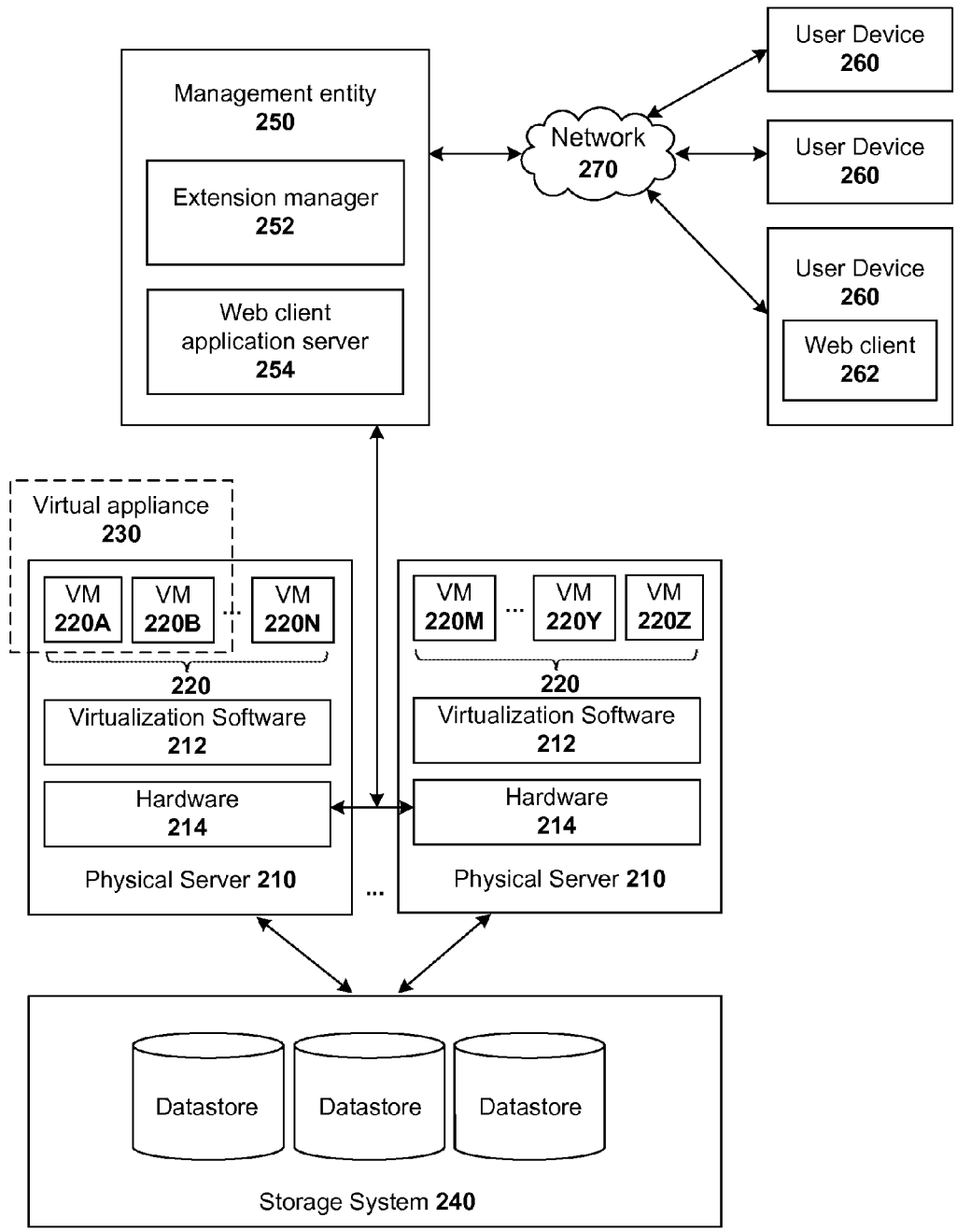
FIG. 2 is a schematic diagram illustrating an example virtualized computing environment in which deployment of a web client plugin may be implemented.

FIG. 2 is a schematic diagram illustrating an example virtualized computing environment 200 in which a web client plugin may be deployed. Although an example is shown, it should be understood that example virtualized computing environment 200 may include additional or alternative components, and may have a different configuration. Virtualized computing environment 200 includes physical servers 210 (e.g., hosts) that each execute virtualization software 212 (e.g., hypervisor) and include suitable hardware 214 to support multiple virtual machines 220. For example, virtual machines labelled 220A to 220Z are shown in FIG. 2, which will be collectively referred to as "virtual machines 220" or a general "virtual machine 220." Virtualization software 212 maintains a mapping between resources allocated to virtual machines 220, and physical resources supported by physical servers 210 and storage system 240. In practice, there may be any suitable number of physical servers 210, each supporting any suitable number of virtual machines 220. At least one virtual machine 220 (two indicated in FIG. 2 as an example and may correspond to the designated virtual machine described above in conjunction with FIG. 1) may be packaged and deployed as virtual appliance 230, which will be explained in more detail with reference to FIG. 3.

Virtualized computing environment 200 further includes management entity 250, which is accessible by user devices 260 to manage various objects (e.g., physical servers 210, virtual machines 220, storage system 240, etc.). Management entity 250 generally provides various management functionalities for users to manage the various objects for any suitable purpose, such as deployment, provisioning, lifecycle management, maintenance, etc. In practice, management entity 250 may be implemented using virtual machine 220 that is different to the designated virtual machine 220 described with reference to FIG. 1 (e.g., designated virtual machine 220 may be 220A while management entity may be 220M in FIG. 2).

A user may operate user device 260 to access a functionality of management entity 250 using web client 262. Management entity 250 further supports web client application server 254 to provide user interface access and plugin functionality for web client 262. Web client 262 may be any suitable browser-based application, such as based on any suitable architecture supported by web client application server 254.

An example architecture may include a user interface layer with an application that displays user interface elements with which users interact (e.g., menus, navigation elements, etc.). A service layer of the example architecture may facilitate various services. Web client 262 may also be a next generation client (NGC). User devices 260 may be operated by any suitable users, such as system administrators, organization administrators, database users, application developers, system architects, etc. Any suitable computing device may be used as user device 260, such as desktop computer, mobile device, tablet computer, and personal digital assistant, etc.

To facilitate functionality extensions, management entity 250 further includes extension manager 252. To extend the functionality of management entity 250, virtual machine 220 may be deployed and registered as a management extension with extension manager 252. Similarly, to extend the functionality of web client 262, a web client plugin may be deployed and registered as a web client extension with extension manager 252. For example, extension manager 252 may support Application Programming Interface (API) calls to register an extension (e.g., "RegisterExtension"), find an extension (e.g., "FindExtension"), unregister an extension (e.g., "UnregisterExtension"), update an extension (e.g., "UpdateExtension"), etc. Although extension manager 252 in the example in FIG. 2 may be used for registration of both management and web client extensions, there may be multiple extension managers supporting the various functionalities of extension manager 252 in practice. Additionally or alternatively, registration of web client extensions may also be supported by web client application server 254.

Figure 3:
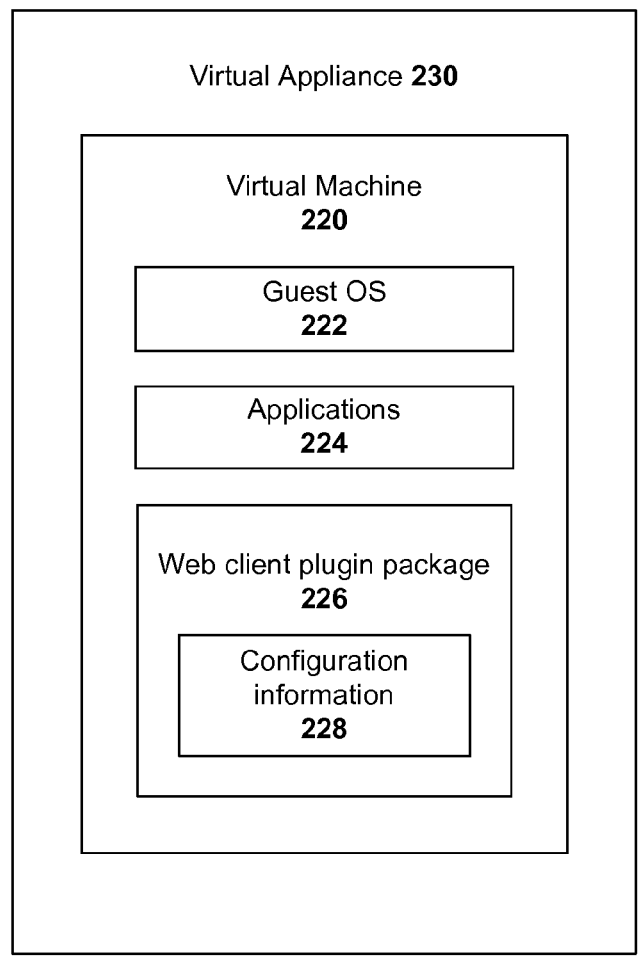
FIG. 3 is a schematic diagram illustrating an example virtual appliance in a virtualized computing environment.

For registration as a management extension, virtual machine 220 may be packaged in virtual appliance 230 using any suitable format, such as in the form of the OVF package. In more detail, FIG. 3 is a schematic diagram illustrating virtual appliance 230 in virtualized computing environment 200. Although an example is shown, it should be understood that example virtual appliance 230 may include additional or alternative components, and may have a different configuration.

OVF is an open format for the packaging and distribution of software to be run on virtual machine 220. OVF package may include several files placed in an OVF directory, such as an OVF descriptor file (e.g., describing contents and requirements of packaged virtual machine 220), metadata (e.g., name, hardware requirements, etc.) and a group of disk images. The OVF descriptor file may be in any suitable format such as extensible markup language (XML) format, and the OVF directory may be compressed (e.g., tar) and distributed as an Open Virtualization Appliance (OVA) file.

The term "virtual appliance" 230 may generally refer to a software solution that includes one or more virtual machines 220 that are packaged, updated, maintained and managed as a unit. In practice, virtual appliance 230 may include disk image of the at least one virtual machine 220 and any relevant software stacks (e.g., virtualized operating systems, hardware, etc.). For developers and users, the benefits of virtual appliances 230 generally include a reduction in development and distribution costs, accelerated time to market and the ability to leverage capabilities of virtualization platforms. If virtual machine 220 and virtual appliance 230 are used to provide a suite of management functionality, they may also be known as management server and management appliance, respectively.

In the example shown in FIG. 3, virtual appliance 230 includes virtual machine 220 (one shown for simplicity) that is allocated with resources to support guest operating system (OS) 222 and applications 224 during the deployment process. For example, the allocated resources may include CPU resources (e.g., processors), memory resources (e.g., random access memory), network resources (e.g., access networks, group of ports, etc.) and storage resources (e.g., virtual disks supported by storage system 240), etc.

To extend the functionality of web client 262, virtual machine 220 further includes web client plugin package 226 that includes configuration information 228 of a web client plugin for web client 262. For example, web client plugin package 226 may be used to extend web client 262 in any suitable manner, such as by adding new user interface elements that retrieve and display data associated with virtual appliance 230 or virtual machine 220. In practice, web client plugin package 226 may include configuration information 228 and plugin modules that are bundled together as a package (e.g., ZIP archive file that includes the plugin modules along with a manifest of deployment information of each plugin module).

Example registration of virtual machine 220 as a management extension will now be explained in more detail with reference to FIG. 4, FIG. 5A and FIG. 5B. Example registration of a web client plugin as a web client extension will be explained with reference to FIG. 6.

Virtual Machine as Management Extension

Figure 4:
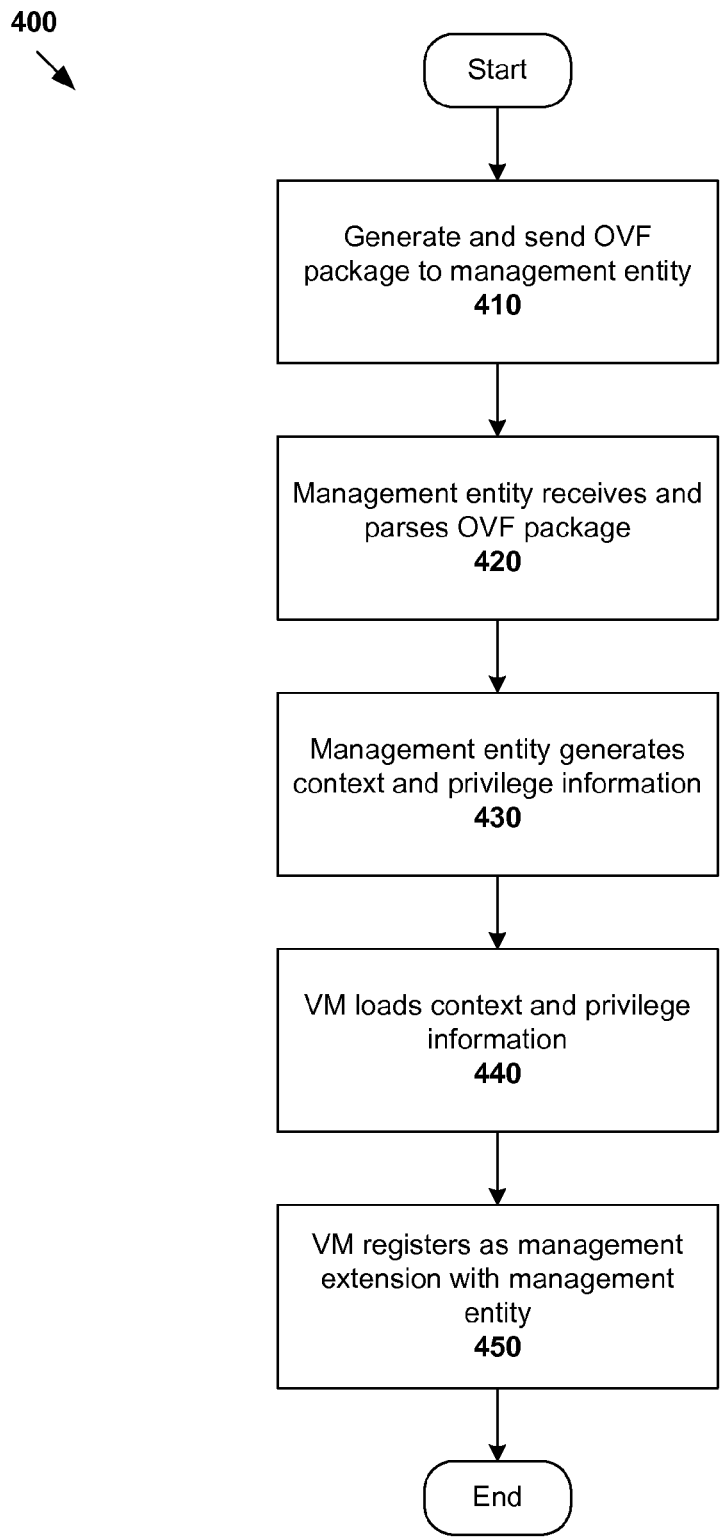
FIG. 4 is a flowchart of an example process for deploying of a virtual machine as a management extension in a virtualized computing environment.

FIG. 4 is a flowchart of example process 400 for deploying of virtual machine 220 as a management extension in virtualized computing environment 200. Example process 400 (related to block 110 in FIG. 1) may include one or more operations, functions, or actions illustrated by one or more blocks, such as blocks 410 to 450. The various blocks may be combined into fewer blocks, divided into additional blocks, and/or eliminated based upon the desired implementation.

At block 410 in FIG. 4, an OVF package is generated and sent to management entity 250 to deploy virtual appliance 230. The deployment may be implemented automatically using a program code (e.g., script at virtual machine 220) or manually by a user (e.g., administrator). The OVF package may include any suitable information to notify management entity 250 that virtual machine 220 wishes to be registered as a management extension.

FIG. 5A illustrates example section 510 in the OVF package for deploying of virtual machine 220 as a management extension. Section 510 may be in an OVF descriptor file of the OVF package and defined as a "<vServiceDependencySection>" element (e.g., with the value of "required=true" in line 1). Example section 510 further sets out various definitions relating to "Type" of dependency (see line 4), "Name" and "Description" of the extension (see lines 5 to 8), etc.

At block 420 in FIG. 4, management entity 250 receives and parses the OVF package. Using the example in FIG. 5A, when parsing section 510 in the OVF package, management entity 250 will be "notified" that virtual machine 220 wishes to be registered as an extension of management entity 250.

At block 430 in FIG. 4, management entity 250 generates context and privilege information for virtual machine 220 for the registration process with extension manager 252. For example, management entity 250 may generate an OVF environment document (e.g., XML format) that contains the context and privilege information for virtual machine 220. The OVF environment refers broadly to a secure communication channel between management entity 250 and guest OS 222 of virtual machine 220.

FIG. 5B illustrates example context and privilege information 520 provided by management entity 250 for the deployment of virtual machine 220 as a management extension. In the example in FIG. 5B, context and privilege information 520 includes an authentication token (see lines 3 and 4) that authenticates virtual machine 220 with management entity 250, and Secure Socket Layer (SSL) thumbprint of an X509 certificate (see lines 5 and 6) that is used to establish a secure Hypertext Transfer Protocol Secure (HTTPS) connection between management entity 250 and virtual machine 220.

Example context and privilege information 520 in FIG. 5B further includes communication parameters that allow guest OS 222 of virtual machine 220 to make a secure connection to management entity 250, such as Internet Protocol (IP) address of management entity 250 (see line 10 in FIG. 5B, i.e. "10.10.10.10"), SSL thumbprint of the X509 certificate (see lines 11 and 12) that management entity 250 uses to make a secure HTTPS connection to virtual machine 220, HTTP port (see line 13) and HTTPS port (see line 14) on which management entity 250 is reachable, and a reference identifier that uniquely identifies virtual machine 220 as a managed object at management entity 250 (see line 15, i.e. managed object reference identifier "VirtualMachine: vm-398"), etc.

At block 440 in FIG. 4, virtual machine 220 loads the context and privilege information generated by management entity 250. For example, a program code (e.g., script) may be run on virtual machine 220 to load the authentication token (see lines 3 and 4 in FIG. 5A), and SSL thumbprint (see lines 5 and 6 in FIG. 5A) generated by management entity 250.

At block 450 in FIG. 4, virtual machine 220 uses the context and privilege information to register with extension manager 252. For example, referring to FIG. 5B, virtual machine 220 may use the authentication token (see lines 3 and 4) to authenticate itself (e.g., using authentication token), generate a self-signed certificate (e.g., using X509 thumbprint) and sends an HTTP POST request to management entity 250.

Header of the HTTP POST includes the authentication token and its body includes the certificate and an extension key associated with the registration of virtual machine 220 as management extension (e.g., extension key="com.vmware.vnas.vcext.instance-18e"). Virtual machine 220 may also provide other properties of the management extension, such as company name, version, etc. The HTTP POST request calls a register extension function (e.g., "RegisterExtension" using an API call) supported by extension manager 252.

Figure 6:
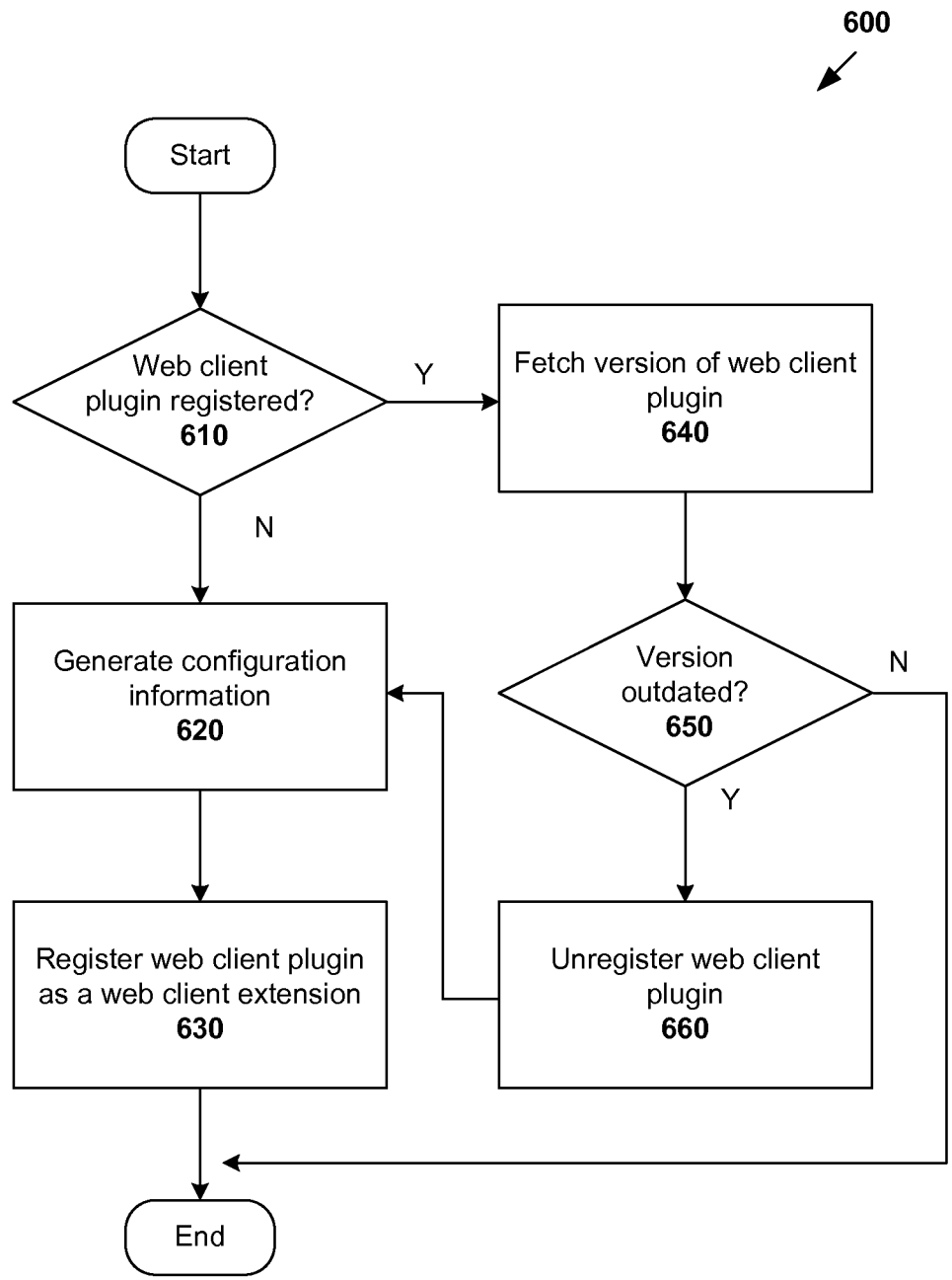
FIG. 6 is a flowchart of an example process for deploying of a web client plugin as a web client extension in a virtualized computing environment.

Once registered as a management extension, virtual machine 220 may also register a web client plugin as a web client extension according to examples in FIG. 6. In this case, the web client plugin may be automatically deployed with the deployment of virtual machine 220 and associated virtual appliance 230. For example, following example process 400, virtual machine 220 has obtained information identifying itself at management entity 250, such as the reference identifier of virtual machine 220 (e.g., reference identifier="VirtualMachine:vm-398" at block 440) and extension key for management extension registration (e.g., extension key="com.vmware.vnas.vcext.instance-18e" at block 450). Further, using the IP address of management entity 250 (e.g., see line 10 in FIG. 5B, i.e. "10.10.10.10"), virtual machine 220 may obtain an identifier of management entity 250 (e.g., serverGuid="D0573D91-315F-43BA-85CB-1624681801D4"), such as using an API call to management entity 250. The reference identifier of virtual machine 220, identifier of management entity 250 and extension key may be included used to deploy the web client plugin.

Web Client Plugin as Web Client Extension

FIG. 6 is a flowchart of example process 600 for deploying of a web client plugin as a web client extension in virtualized computing environment 200. Example process 600 (related to blocks 120 and 130 in FIG. 1) may include one or more operations, functions, or actions illustrated by one or more blocks, such as blocks 610 to 660. The various blocks may be combined into fewer blocks, divided into additional blocks, and/or eliminated based upon the desired implementation.

The web client plugin (relating to web client plugin package 226) may be used to implement any suitable extended functionality, such as to extend a user interface layer (e.g., add new user interface element, etc.) and/or a service layer (e.g., add new service to populate the new user interface element with data, etc.) of web client 262. The extended functionality may be implemented using any suitable programming language, such as Java Servlets or Java Server Pages (JSPs), Microsoft Active Server Pages (ASP-.NET), scripting language, static or dynamic Hypertext Markup Language (HTML) pages, etc.

In FIG. 6, blocks 610 to 630 are related to the deployment of a web client plugin for the first time (i.e., new installation), and blocks 640 to 660 the re-deployment of the web client plugin (e.g., an upgrade installation when there is a newer version).

At block 610 in FIG. 6, virtual machine 220 determines whether the web client plugin relating to web client plugin package 226 is already registered with extension manager 252. For example, if the web client plugin is already registered, virtual machine 220 may search for an extension key associated with the web client plugin.

At block 620 in FIG. 6, virtual machine 220 generates configuration information (see also 228 in FIG. 3) to register the web client plugin with extension manager 252. Although block 620 is shown to occur after block 610 in FIG. 6, it will be appreciated that it is not necessary to generate configuration information 228 after the determination at block 610. Instead, configuration information 228 may be generated right after virtual machine 220 is registered as a management extension according to example process in FIG. 4.

To facilitate automatic discovery of virtual machine 220 when the web client plugin relating to package 226 is in use, configuration information 228 includes information identifying virtual machine 220 at management entity 250, such as one or more of the following:

(1) An extension key associated with registration of virtual machine 220 as a management extension with extension manager 252 at block 450 in FIG. 4. For example, the extension key may be in the form of "mgmtExtensionKey=com.vmware.vnas.vcext.instance-18e." This information is generally available to virtual machine 220, which may access it in a memory, from a file, etc. The extension key may also be generated by virtual machine 220, and sent to the management entity 250 during the management extension registration.

(2) A reference identifier that uniquely identifies virtual machine 220 as an object managed by the management entity 250. For example, the reference identifier may be in the form of "mgmtRefId=VirtualMachine\:vm-398." This information may be provided by management entity 250 at block 440 in FIG. 4. See also line 15 in example context and privilege information 520 in FIG. 5B.

(3) An identifier that identifies management entity 250, such as in the form of "serverGuid=D0573D91-315F-43BA-85CB-1624681801D4." The identifier may be obtained when virtual machine 220 is registered as a management extension with management entity 250. For example, management entity 250 may expose an API for virtual machine 220 to obtain its "serverGuid", which uniquely identifies management entity 250.

Configuration information 228 may be in suitable format (e.g., XML) and include other information such as an extension key that identifies the web client plugin relating to package 226 as a web client extension at management entity 250, a description of the function of the web client plugin, and definition of extended functionality (e.g., new user interface elements such as menus, tabs, toolbars, icons etc.) that may also specify how users will access features within web client 262. Configuration information 228 may be dynamically generated and injected into a ZIP archive file of web client plugin package 226.

At block 630 in FIG. 6, virtual machine 220 registers the web client plugin as a web client extension with management entity 250. For example, this may involve registering configuration information 228 by providing extension manager 252 with a link to web client plugin package 226 that includes configuration information 228. Once registered, web client application server 254 may download web client plugin package 226 (and therefore configuration information 228) using the link.

Virtual machine 220 may invoke a function (e.g., "RegisterExtension" using an API call) supported by extension manager 252 to register the web client plugin. During the registration process, context and privilege information (see block 440 in FIG. 4 and FIG. 5B) provided by management entity 250 may be used to authenticate virtual machine 220 (e.g., using authentication token) and generate a self-signed certificate (e.g., using X509 thumbprint).

Further, at blocks 640 to 660 in FIG. 6, virtual machine 220 may unregister the web client plugin deployed using web client plugin package 226 if it is outdated and a newer version is available. At block 640 in FIG. 6, after determining that the web client plugin is already registered, virtual machine 220 fetches version information associated with the web client plugin. For example, virtual machine 220 may invoke a function (e.g., "Find Extension" using an API call) supported by extension manager 252 to find the registered web client extension using its extension key.

At blocks 650 and 660 in FIG. 6, if the web client plugin is determined as outdated based on the version information, virtual machine 220 unregisters the web client plugin before proceeding to blocks 620 and 630. For example, virtual machine 220 may invoke a function (e.g., "UnregisterExtension" using an API call) supported by extension manager 252 for this purpose.

Accessing Virtual Machine Via Web Client Plugin

Once registered, extended functionality provided by virtual machine 220 and the web client plugin will be available via web client 262. When web client 262 connects to management entity 250 via web client 262, extension manager 252 sends web client 262 a link to web client plugin package 226 containing configuration information 228. Web client 262 may then use configuration information 228 to, for example, populate web client 262 with user interface elements and associated data.

When web client 262 subsequently selects an extended functionality provided by virtual machine 220 and the web client plugin, configuration information 228 may be leveraged to find virtual machine 220. For example, virtual machine 220 may be identified using its reference identifier, and information relating to virtual machine 220 as an extension may be retrieved using its extension key in configuration information. This automatic discovery process in turn allows, for example, translation of user operations to API calls to access extended functionality provided by virtual machine 220.

In more detail, using examples discussed with reference to FIG. 4, configuration information 228 may be used as follows. (1) The extension key (e.g., "mgmtExtensionKey") may be used to find the registration of virtual machine 220 as a management extension at management entity 250. (2) The reference identifier of virtual machine 220 (e.g., "mgmtRefId") may be used to identify virtual machine 220 to retrieve its information (e.g., IP address of virtual machine 220). (3) The identifier of management entity 250 (e.g., "serverGuid") may be used to identify management entity 250 with which a web client plugin is communicating.

Computer System

Figure 7:
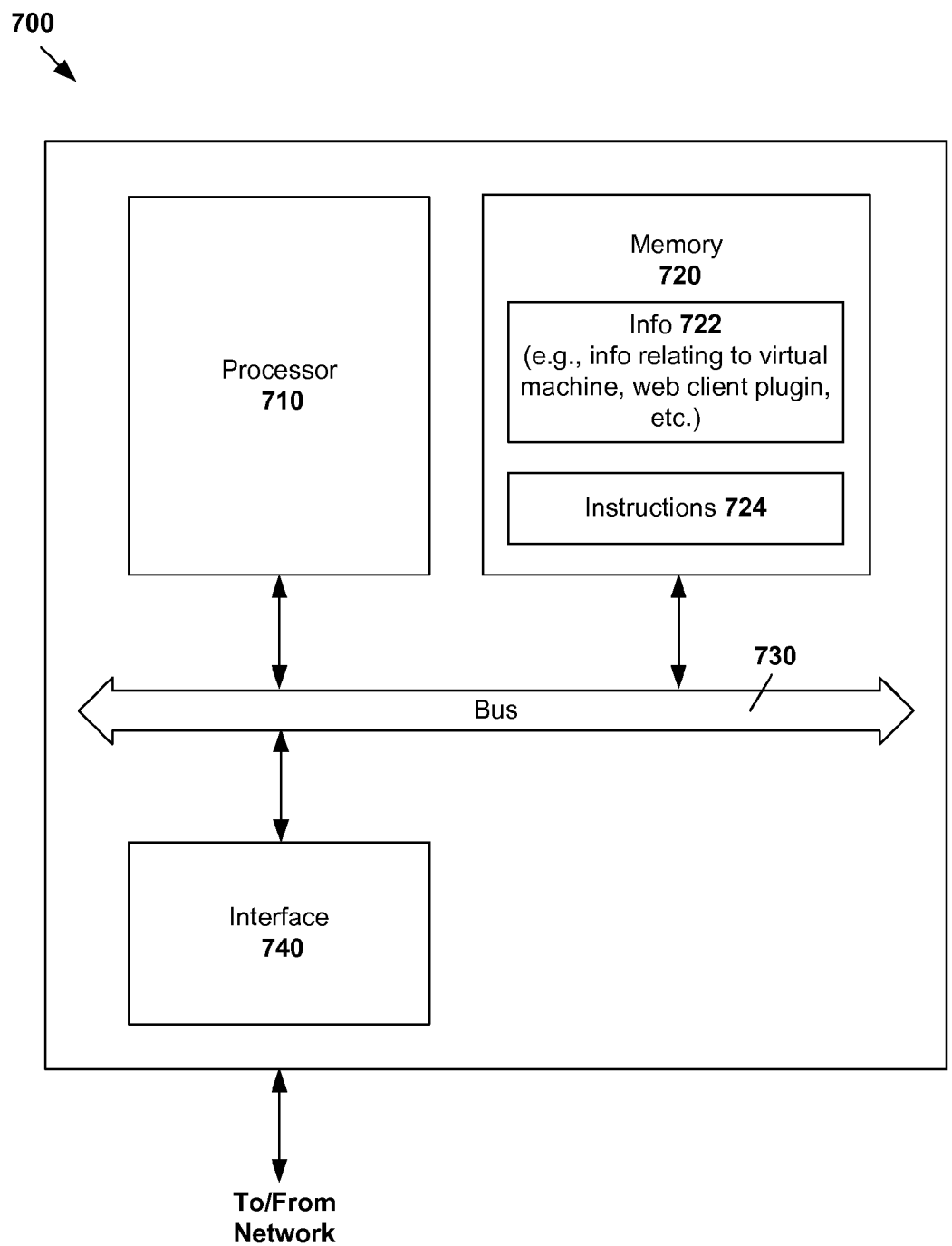
FIG. 7 is a schematic diagram illustrating an example computer system for deploying of a web client plugin in the example virtualized computing environment in FIG. 1.

The above examples can be implemented by hardware, software or firmware or a combination thereof. FIG. 7 is a schematic diagram of an example computer system 700 for deploying of a web client plugin in virtualized computing environment 200. Example computer system 700 is capable of acting as physical server 210 that supports virtual appliance 230 and virtual machine 220 described herein.

Example computer system 700 may include processor 710, memory 720, network interface device 740, and bus 730 that facilitates communication among these illustrated components and other components. Processor 710 is to perform processes described herein with reference to FIG. 1 to FIG. 6. Memory 720 may store any suitable information 722, such as information relating to virtual appliance 230, virtual machine 220 and the web client plugin, etc. Memory 720 may further store computer-readable instructions 724 which, in response to execution by processor 710, cause processor 710 to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to deploy a web client plugin in a virtualized computing environment, the method comprising:
   obtaining, by a virtual machine, information identifying the virtual machine at a management entity in the virtualized computing environment, wherein the virtual machine includes a guest operating system (OS), and the management entity, accessible by a web client, is configured to support functionalities to manage a plurality of objects in the virtualized computing environment, including the virtual machine;
   generating, by the virtual machine, configuration information that includes the information identifying the virtual machine;
   registering, with the management entity by the virtual machine, the configuration information to deploy the web client plugin as a web client extension that extends a functionality of the web client such that, in response to an access to the virtual machine via the web client plugin, the web client plugin is able to automatically identify the virtual machine based on the configuration information; and
   registering, with the management entity, the virtual machine as a management extension that extends a functionality of the management entity with an extension key by
   sending, to the management entity, a specification to notify the management entity that the virtual machine wishes to be registered as the management extension;
   receiving, from the management entity, context and privilege information; and
   based on the context and privilege information, sending, to the management entity, a request that includes the extension key.

2. The method of claim 1, wherein obtaining the information identifying the virtual machine comprises one or more of:
   receiving, from the management entity, a reference identifier that allows the web client plugin to identify the virtual machine as an object managed by the management entity; and
   receiving, from the management entity, an identifier of the management entity that allows the web client plugin to identify the management entity.

3. The method of claim 2, wherein obtaining the information identifying the virtual machine further comprises:
   generating the extension key that allows the web client plugin to identify the virtual machine as the management extension.

4. The method of claim 1, wherein the specification is an Open Virtualization Format (OVF) package that packages the virtual machine as a virtual appliance.

5. The method of claim 1, wherein the context and privilege information includes one or more of: an authentication code and a thumbprint of a certificate.

6. The method of claim 1, wherein registering the web client plugin further comprises:
   sending, to the management entity, a request that includes a link to a web client plugin package that includes the configuration information.

7. The method of claim 1, wherein prior to generating the configuration information, the method further comprises:
   in response to determination that the web client plugin is previously deployed, retrieving, from the management entity, version information of the web client plugin; and
   in response to determination that the web client plugin is outdated based on the version information, sending, to the management entity, a request to unregister the web client plugin.

8. The method of claim 1, wherein the management entity supports an extension manager with which the web plugin is registered as the web client extension and with which the virtual machine is registered as the management extension.

9. The method of claim 1, wherein the management entity supports a web client application server to support functionality of the web client plugin.

10. A non-transitory computer-readable storage medium that includes a set of instructions which, in response to execution by a processor, causes the processor to perform a method to deploy a web client plugin in a virtualized computing environment, the method comprising:
    obtaining, by a virtual machine, information identifying the virtual machine at a management entity in the virtualized computing environment, wherein the virtual machine includes a guest operating system (OS), and the management entity, accessible by a web client, is configured to support functionalities to manage a plurality of objects in the virtualized computing environment, including the virtual machine;
    generating, by the virtual machine, configuration information that includes the information identifying the virtual machine;
    registering, with the management entity by the virtual machine, the configuration information to deploy the web client plugin as a web client extension that extends a functionality of the web client such that, in response to an access to the virtual machine via the web client plugin, the web client plugin is able to automatically identify the virtual machine based on the configuration information; and
    registering, with the management entity, the virtual machine as a management extension that extends a functionality of the management entity with an extension key by
    sending, to the management entity, a specification to notify the management entity that the virtual machine wishes to be registered as the management extension;
    receiving, from the management entity, context and privilege information; and
    based on the context and privilege information, sending, to the management entity, a request that includes the extension key.

11. The non-transitory computer-readable storage medium of claim 10, wherein obtaining the information identifying the virtual machine comprises one or more of:
    receiving, from the management entity, a reference identifier that allows the web client plugin to identify the virtual machine as an object managed by the management entity; and
    receiving, from the management entity, an identifier of the management entity that allows the web client plugin to identify the management entity.

12. The non-transitory computer-readable storage medium 11, wherein obtaining the information identifying the virtual machine further comprises:
    generating the extension key that allows the web client plugin to identify the virtual machine as the management extension.

13. The non-transitory computer-readable storage medium 10, wherein the specification is an Open Virtualization Format (OVF) package that packages the virtual machine as a virtual appliance.

14. The non-transitory computer-readable storage medium 10, wherein the context and privilege information includes one or more of: an authentication code and a thumbprint of a certificate.

15. The non-transitory computer-readable storage medium 10, wherein registering the web client plugin further comprises:
   sending, to the management entity, a request that includes a link to a web client plugin package that includes the configuration information.

16. The non-transitory computer-readable storage medium 10, wherein prior to generating the configuration information, the method further comprises:
   in response to determination that the web client plugin is previously deployed, retrieving, from the management entity, version information of the web client plugin; and
   in response to determination that the web client plugin is outdated based on the version information, sending, to the management entity, a request to unregister the web client plugin.

17. The non-transitory computer-readable storage medium 10, wherein the management entity comprises:
   an extension manager with which the web plugin is registered as the web client extension and with which the virtual machine is registered as the management extension.

18. A computer system for deploying a web client plugin in a virtualized computing environment, wherein the computer system comprises:
   a processor;
   a non-transitory computer-readable medium having stored thereon instructions that, in response to execution by the processor, cause the processor to:
   obtain information identifying a virtual machine with a guest operating system (OS) at a management entity in the virtualized computing environment;
   generate configuration information that includes the information identifying the virtual machine, wherein the management entity, accessible by a web client, is configured to support functionalities to manage a plurality of objects in the virtualized computing environment;
   register, with the management entity, the configuration information to deploy the web client plugin as a web client extension that extends a functionality of the web client such that, in response to an access to the virtual machine via the web client plugin, the web client plugin is able to automatically identify the virtual machine based on the configuration information;
   register, with the management entity, the virtual machine as a management extension that extends a functionality of the management entity with an extension key by
   sending, to the management entity, a specification to notify the management entity that the virtual machine wishes to be registered as the management extension;
   receiving, from the management entity, context and privilege information; and
   based on the context and privilege information, sending, to the management entity, a request that includes the extension key.

* * * * *